3,297,524
WATER-SOLUBLE, NORMALLY SOLID ORGANIC MERCURY COMPOSITION AND NOVEL ORGANIC MERCURY ADDITION COMPOUNDS

Sergey V. Chodsky, New York, N.Y., and John Geraci, Ridgefield, N.J., assignors to Guard Chemical Company, Inc., Ossining, N.Y., a corporation of New York
No Drawing. Filed Dec. 6, 1963, Ser. No. 328,488
12 Claims. (Cl. 167—42)

This invention relates to normally solid organic mercury materials which are readily soluble in water and water miscible solvents. In particular the invention relates to organic mercury addition compounds which are readily soluble in water and water miscible solvents to give clear stable solutions; compositions useful for preparing such compounds which compositions are also highly soluble in water and water miscible solvents to form clear, stable solutions; and to solutions of the addition compounds or compositions.

Organic mercury compounds have long been known as premium biocidal agents. Thus, organic mercury compounds are widely used as fungicides, bactericides, etc. In such applications they are used in paints, adhesives, acoustical tile, as agricultural sprays, in treating textiles and leather, and in a host of other similar applications wherein their long-lasting biocidal properties are of use. In such applications it is desirable to apply the organic mercury compound using a water carrier. Organic mercury compounds in general are highly insoluble in water so that the ultimate user of the product has difficulty in effecting solvation. Accordingly, it is conventional in the art to prepare concentrated aqueous solutions of the organic mercury compound which can then be diluted by the ultimate user. Even under this practice, where the concentrated solutions are prepared by the manufacturer under factory conditions, difficulty is encountered in preparing the stable, concentrated solutions. Most commercial solutions of phenyl mercury acetate, for example, contain only from about 20 to about 30 percent by weight of the phenyl mercury compound. Thus, the handling and use of organic mercury compounds involves the extra handling and freight costs necessarily attendant on handling the solutions containing from about 70 to about 80 percent by weight of water. In addition to large amounts of water these commercial solutions usually contain significant amounts of volatile materials such as ammonia, methanol, ethanol and the like, thus creating further handling problems.

Prior art proposals for increasing the solubility of organic mercury compounds in water include the addition of ammonium hydroxide and a soluble ammonium salt to the solution in amounts sufficient to maintain the pH of the solution above about 7.0. It has also been proposed to form water-soluble addition compounds of organic mercury compounds with hydroxyalkyl amine compounds.

It is an object of this invention to provide normally solid organic mercury addition compounds which are highly soluble in water and water miscible solvents.

A specific object of the invention is to provide normally solid phenyl mercury addition compounds which are soluble in water and water miscible solvents to give stable, concentrated solutions.

A further object of the invention is to provide normally solid, water-soluble mixtures of an organic mercury compound and a solubilizing agent.

Still another object of the invention is to provide concentrated aqueous solutions of the novel normally solid organic mercury addition compounds or of the novel normally solid compositions comprising an organic mercury compound and a solubilizing agent.

Further objects and the many advantages of the invention will be apparent from the following more detailed description.

For better understanding, the normally solid water-soluble compositions of the invention will first be described. These compositions comprise, in general, a normally solid organic mercury compound having the general formula:

(I) $\qquad R-(Hg-X)_n$ in which R can be an aromatic, aliphatic or alicyclic organic radical, X is hydroxyl or the anion of an inorganic or organic acid, and $n$ represents the degree of mercuration of the radical R, together with from about 5 to about 95 percent by weight, based on the total weight of the composition, of a normally solid solubilizing agent having the general formula:

(II) 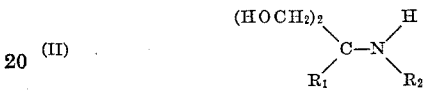

where $R_1$ and $R_2$ can be hydrogen, alkyl, aryl, or cycloalkyl radicals or hydroxyalkyl radicals having from 1 to 3 carbon atoms.

More particularly, R in general Formula I can be, for example, an aryl radical such as phenyl, tolyl, xylyl, naphthyl and the like; an alkyl radical such as methyl, ethyl, propyl, hexyl, octyl, ethoxyethyl and the like; or a cycloalkyl radical such as cyclopentyl, cyclohexyl and the like. The anion X can be, for example, hydroxyl, nitrate, borate, acetate, benzoate, butyrate, lactate, propionate and the like. The symbol $n$ representing the degree of mercuration of R usually is equal to the number 1. Polymercurated materials where $n$ ranges as high as about 4 are however included within the scope of the invention. It is to be understood that polymercurated materials usually are mixtures of compounds of different degrees of mercuration so that $n$ is not necessarily an integer but may be a number, such as 2.5, representing the average degree of mercuration of the total mixture.

In the general Formula II $R_1$ and $R_2$ can be hydrogen or any one of the radicals listed above for R. Preferably $R_1$ and $R_2$ are hydrogen, alkyl radicals containing from 1 to 6 carbon atoms or aryl radicals containing from 6 to 8 carbon atoms. As noted, $R_1$ and $R_2$ can also be hydroxymethyl, hydroxyethyl, or hydroxypropyl radicals.

The substituents represented by R, $R_1$, and $R_2$ in the raw materials can be the same or different. That is, it is not necessary that all be the same at one time.

The most particularly preferred materials used in the practice of this invention are phenyl mercuric salts and tris(hydroxymethyl)aminomethane.

The compositions of the invention are prepared by blending the solid organic mercury compound with the solid solubilizing agent until a thoroughly blended substantially homogeneous mixture of the two raw materials is obtained. The resulting blend is highly soluble in water and water miscible solvents or combinations thereof. The resulting blends are usually ground to form finely divided powders which will have a higher speed of solubilization because of higher exposed surface area. Where great speed of solubilization is not a particularly important factor the powders may be tableted, formed into capsules, etc., as desired.

The ratio of amine solubilizing agent to organic mercury compound may vary over a wide range. Thus, the amine may constitute from about 5 to about 95 percent by weight based on the total weight of the composition. When the molar ratio of amine to mercury is less than about one increasingly larger amounts of amine in the blend of solids provide increasing facility of solubilization of the composition in water or water miscible solvents.

Preferably, the compositions contain sufficient amounts of amine to provide at least one mole of amine for each mole of mercury in the organic mercury compound. The use of at least equimolar quantities is required for complete reaction in preparing the addition compounds of this invention, as will be described hereinafter. Less than molar equivalents of the amine additive are nevertheless included within the scope of the invention in view of the fact that all mixtures containing about 5 percent by weight or more of the amine provide solutions containing greatly increased amounts of solubilized mercury as compared to solutions made from the organic mercury compound per se. Thus, even though only about 5 percent amine additive is present, the composition is still useful for imparting biological effects because: (1) unreacted organic mercury compound is partially soluble in the total final formulation; (2) unreacted organic mercury compound is more soluble in the reaction product than in the solution itself; and (3) unreacted organic mercury compound, because of the presence of the amine, becomes evenly dispersed throughout the entire formulation. The maximum amount of amine additive is not critical and usually is dictated by commercial convenience or economics. As noted above, for complete solubility, for high speed of dissolution, and for preparing the organic mercury addition compounds to be described hereinafter it is necessary to have at least one mole of amine for each mole equivalent of mercury in the organic mercury compound present in the composition. Greater than equimolar amounts of amine do not usually provide any further significant increase in solubility.

The organic mercury addition compounds of this invention have the following general formula:

(III)
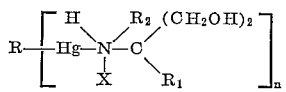

where R, $R_1$, $R_2$, X and $n$ all have the same significance as previously described.

These compounds are suitably prepared by crystallization from solutions of the above-described organic mercury compositions. As noted, the solutions must contain equivalent molar quantities of the reactants if complete reaction is desired. Crystallization of the compounds may be achieved in any suitable manner which does not destroy the reactants. Because of the high solubility of the compositions in the solvents the process usually includes an initial step of removing (by distillation, for example) most of the solvent in which the composition has been dissolved. Then the very highly concentrated solution is cooled to temperatures at which the addition compounds crystallize and can be separated from the solvent liquid.

The addition compounds of this invention are also extremely soluble in water and in other solvents in which the compositions of the invention are soluble.

Hence, this invention provides normally solid, stable compositions and normally solid, stable addition compounds which may be sold as such, in powdered and/or crystalline form respectively, and which can be quickly and completely dissolved in various solvents by the ultimate user. The excellent solubility of the materials of this invention also permits direct incorporation thereof into the final formulation to which biocidal properties are to be imparted. This offers the opportunity for eliminating the usual step of first preparing a working solution of organic mercury salt which solution is then incorporated into the final formulation. It will be obvious that working solutions can be prepared and used in known manner if desired. The advantages of such materials are readily apparent.

The compositions and the addition compounds of the invention are soluble in a wide variety of common solvents. For example, solvents which may be used to form solutions of the compositions or addition compounds include water, water-soluble alcohols, water-soluble glycols, water-soluble glycerols and the like; and mixtures of these solvents with each other. One very important property of the compositions and compounds of this invention is the high solubility of each in acid, neutral or alkaline solutions.

Other materials which do not react adversely with the organic mercury materials may be added to the addition compound, the composition or the solutions produced therefrom. As the solutions prepared are ultimately to be added to other compositions, such as paints, textile and leather-treating solutions, etc., which customarily contain significant amounts of other materials it is apparent that the solutions possess excellent stability and may include such other materials without departing from the invention. In addition to having excellent water dispersability the solutions formed in accordance with this invention can, in turn, be diluted infinitely with water without precipitation. Thus, the normally solid organic mercury materials of the invention (that is, the addition compounds or the compositions) may be made up into concentrated solutions at the point of use and then diluted to the working concentration when desired. Alternatively, the organic mercury materials may be dissolved in water to directly form the working solution. It should also be noted that solutions may be formed by adding the organic mercury compound represented by the above Formula I to a pre-formed solution of the amine compound represented by the Formula II above.

Quite surprisingly it has been found that the organic mercury compositions and the organic mercury addition compounds of the invention, when dissolved in a suitable solvent, possess equivalent biological activity when compared to corresponding amounts of the organic mercury compound used as a raw material in preparation of the compositions or addition compounds. It has further been found that the materials of this invention possess increased biological activity when compared with the organic mercury compound raw material on an equal mercury basis. Thus, unexpected and truly surprising biocidal properties are obtained with the solutions of the invention.

In a preferred embodiment of the invention the water soluble organic mercury materials of the invention are packaged in water-soluble film-forming materials. This may be done by placing the water-soluble material in a bag or similar packet or container formed of a water-soluble film-forming polymer. Alternatively, the particles of the material may be sprayed or tumbled with a water-soluble film-forming polymer either in the bulk form or in the form of an organic liquid solution to coat the individual particles. In this embodiment the material retains its free-flowing particulate form. Any of the water-soluble film-forming polymers known to the art may be used in this manner. Examples of such materials are the water-soluble cellulose esters and ethers such as methyl cellulose, carboxymethyl cellulose, hydroxymethyl cellulose, etc.; similar derivatives of starch and dextran such as carboxymethyl dextran; naturally occurring water-soluble polymers such as alginic acid; and water-soluble polymers prepared from ethylenically unsaturated monomers such as polyvinyl alcohol, polyacrylamide, etc. Polymers insoluble in water but soluble in dilute aqueous alkali may be used as a packaging material in a similar manner.

The following specific examples illustrate without limiting the invention. In the examples, all parts are parts by weight unless otherwise noted.

*Example 1*

A suitable portion of tris(hydroxymethyl) aminomethane (also known as 2-amino-2-hydroxymethyl-1,3-propanediol) was ground to a fine powder. Fifty parts of this powder were thoroughly blended with one hundred parts of phenyl mercury acetate until a completely homogeneous mixture was obtained. Analysis of the mixture showed that it contained 39.3 percent by weight of mercury. The mixture was completely soluble in water at room temperature with only moderate stirring forming a stable solution containing 50 percent by weight of solids and about 20 percent by weight of mercury metal. Stable 50 percent solutions in room temperature water at low pH (about 2 or 3) and high pH (about 11 or 12) were also easily prepared. Stable solutions of 25–30 percent by weight of the composition in methanol, about 30 percent by weight in isopropanol and about 25 percent by weight in propylene glycol were prepared at room temperature with no difficulty. More highly concentrated solutions (up to 50 percent by weight of the composition) in the last three solvents were easily prepared at higher temperatures.

*Example 2*

In this example the materials were the same as those described in Example 1. The composition was prepared by blending 100 parts of phenyl mercury acetate with 100 parts of powdered tris(hydroxymethyl) aminomethane until a completely homogeneous mixture was obtained. This composition was found to contain 29.5 percent by weight of mercury. The mixture was completely soluble in water at room temperature with only moderate stirring forming a 50 percent by weight solution containing about 15 percent by weight mercury metal. Similarly, 50 percent solutions of the composition were prepared in room temperature water having a pH of about 2 or 3 and a pH of about 11 or 12. Stable concentrated solutions of the composition in methanol, dioxane and diethylene glycol were also easily prepared.

*Example 3*

A polymercurated material having the formula:

(IV)  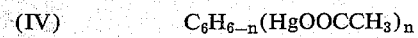

wherein $n$ is between 2 and 3 was recovered as a by-product from the production of phenyl mercury acetate. The polymercurated material was thoroughly blended with equal parts by weight of powdered tris(hydroxymethyl) aminomethane until a completely homogeneous mixture was obtained. The resulting mixture was soluble in water at room temperature with only moderate stirring to produce a stable solution containing 50 percent solids. Similarly, 50 percent solutions of the compositions were prepared in methanol, dioxane and diethylene glycol monoethyl ether.

*Examples 4–7*

In these examples, completely homogeneous separate mixtures of powdered tris(hydroxymethyl) aminomethane and each of the compounds phenyl mercury benzoate, phenyl mercury propionate, phenyl mercury butyrate, and phenyl mercury lactate were prepared. Each mixture contained equal parts by weight of the mercury compound and the aminomethane compound.

The composition containing benzoate was soluble in water at about 70° centigrade forming a stable 50 percent by weight solution. In water of pH about 2 or 3 and pH of 11 or 12 at the same temperature solutions containing about 30–40 percent of the benzoate-containing composition were easily prepared. This composition was also readily soluble in methanol at room temperature.

The composition containing propionate was readily soluble in water at room temperature and at about neutral pH, pH of about 2 or 3 and pH of about 11 or 12 forming in each instance stable solutions containing up to 50 percent by weight of the composition. Stable solutions containing about 35 percent by weight of this composition in methanol at room temperature, and about 25 to 30 percent of the composition in propylene glycol at room temperature were prepared with no difficulty.

The butyrate-containing composition was similarly easily dissolved in room temperature water to form stable solutions containing as much as 40 or 45 percent by weight of the composition at about neutral pH, and at pH's of about 2 or 3 and about 11 or 12. Stable solutions containing about 20 to 25 percent of this composition in methanol at room temperature were also easily prepared.

Stable solutions containing about 50 percent by weight of the lactate-containing composition in room temperature water at about neutral pH and at pH of about 2 or 3 or about 11 or 12 were prepared with no difficulty. Stable solutions containing up to about 25 or 30 percent of this composition in isopropanol at room temperature were also prepared.

*Example 8*

A completely homogeneous mixture containing 50 parts of phenyl mercury 2-ethylhexanoate and 50 parts of tris (hydroxymethyl) aminomethane was prepared by thoroughly blending the materials. The thoroughly blended mixture was completely soluble in methanol at room temperature with only moderate stirring forming a 50 percent by weight solution. A stable solution of 50 percent by weight of the composition in a solvent mixture of water and about 20 percent by weight methanol was also prepared.

*Example 9*

In this example 100 parts of powdered tris(hydroxymethyl) aminomethane were blended with 100 parts of phenyl mercury nitrate until a completely homogeneous mixture was obtained. The composition was completely soluble in water at room temperature with only moderate stirring forming a 50 percent solution. In a similar manner 50 percent solutions of the composition in room temperature water having a pH of about 2 or 3 or a pH of about 11 or 12 were prepared. Stable solutions containing about 10 to 15 percent of the composition in methanol and about 30 percent of the composition in propylene glycol were also easily prepared at room temperature.

*Example 10*

A sample of trimercurated phenyl mercuric acetate was prepared using laboratory procedures.

A portion of this trimercurated material was blended with tris(hydroxymethyl) aminomethane to form a homogeneous mixture containing one mol of each of the ingredients. This mixture was completely soluble in water at room temperature with only moderate stirring forming a stable solution containing 25 percent by weight of dissolved solids. When the temperature of the water was increased to about 30° centigrade a stable solution containing 35 percent solids could be prepared. At 80° centigrade solutions containing as much as 50 percent by weight of the composition were readily prepared.

A mixture containing one mol of the trimercurated acetate material and two mols of the aminomethane compound was also prepared. Stable solutions containing up to 40 percent by weight of this mixture were prepared in water at room temperature with no difficulty. A stable 50 percent solution of this mixture in water at 45° centigrade was also easily prepared.

*Example 11*

A mixture containing 33.6 parts of chemically pure phenyl mercury acetate and 12.2 parts of powdered tris-(hydroxymethyl) aminomethane were refluxed in 100 milliliters of methyl alcohol for 30 minutes. A clear stable solution was obtained. Approximately 80 milliliters of the methanol solvent were slowly distilled off in a water bath. A white crystalline precipitate was formed when the highly concentrated warm solution was cooled to room temperature.

The crystalline material was separated from the remaining solvent and air dried at 60° centigrade. The melting point of the crystalline product was found to be 128° to 131° centigrade. Titrimetric analysis of the crystalline material showed that it contained 43.75 percent by weight of mercury. It was concluded that the crystalline material was the compound represented by the formula (V)   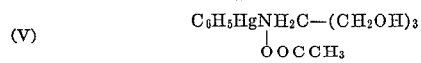

The crystalline product was completely soluble in water, methanol, ethanol and dioxane at room temperatures. A water solution containing 44 percent by weight of the crystalline material was readily obtained at room temperature with only moderate stirring. The pH of this solution was 7.9. A 1 percent solution prepared by dilution of the concentrated solution had a pH of 7.5.

*Examples 12–18*

By proceeding in the manner described in Example 11 equimolar quantities of tris(hydroxymethyl) aminomethane and chemically pure phenyl mercury benzoate, phenyl mercury propionate, phenyl mercury lactate, phenyl mercury 2-ethylhexanoate, phenyl mercury borate, phenyl mercury nitrate and phenyl mercury butyrate were reacted in solution to produce addition compounds each of which was recovered by crystallization and identified. It was concluded that each of the crystalline products was a compound having a formula within the scope of the general Formula III hereinabove.

Each crystalline addition compound thus prepared was highly soluble in water and in other water miscible solvents similarly as the mixtures of the starting materials shown in the previous samples.

*Example 19*

This example illustrates the surprising synergistic biological activity of the organic mercury addition compounds of this invention. In the examples the activity of the materials was determined in accordance with the tests described in Conkey, J. H., and Carlson, John A., "Relative Toxicity of Disinfectants Available for Use in the Pulp and Paper Industry," 1956 Supplement to the Institute of Paper Chemistry, Appleton, Wisconsin, 1956.

For the purposes of comparison an aqueous solution prepared as described in Example 1 and diluted as necessary was compared with aqueous solutions of phenyl mercury acetate on an equal product basis and on an equal mercury content basis. The test organisms included the bacteria *Aerobacter aerogenes* and *Bacillus mycoides* and the fungi *Aspergillus niger* and *Aspergillus orylae*. In each case it was found that the solution containing the phenyl mercury composition of Example 1, even though it contained less mercury was just as effective as the control solution of phenyl mercury acetate. When the phenyl mercury acetate control solution and the solution of Example 1 were compared on an equal mercury basis it was found that the solution of this invention had increased biological activity. For example, it was found that the inhibiting concentration (in parts per million of mercury) for the solution of Example 1 was 0.5 and 5.0 for *Bacillus mycoides* and *Aerobacta aerogenes*, respectively. In comparison, it was found that the inhibiting concentrations for a solution of technically pure phenyl mercury acetate containing an equal amount of mercury were 1.0 and 8.0 parts per million of mercury, respectively.

Similar results were obtained when the comparison was made with methanol solutions.

Other normally solid organic mercury compounds that can be used to prepare the compositions, addition compounds or solutions of this invention include, for example, alkyl mercury compounds such as ethoxy ethyl mercury acetate and the like; aryl mercury compounds such as tolyl mercury acetate, xylyl mercury acetate and the like; and cycloalkyl mercury compounds such as cyclohexyl mercury acetate. Alkyl, aryl and cycloalkyl mercury hydroxides can be used similarly as the acetates and other salts illustrated in the examples.

Normally solid amine compounds of the general Formula II that can be used in lieu of the tris(hydroxymethyl) aminomethane used in the examples include, for example, 2-amino-2-methyl-1,3-propanediol; 2-amino-2-ethyl-1,3-propanediol; 2-amino-2-hydroxyethyl-1,3-propanediol; 2-methylamino-2-hydroxymethyl-1,3-propanediol; 2-hydroxyethylamino-2-hydroxymethyl-1,3-propanediol; 2-methylamino-2-methyl-1,3-propanediol and other like compounds.

The advantages of the compositions and of the addition compounds of this invention over previously known organic mercury materials include substantial savings in cost of storage and shipment, greater biocidal activity, better stability in the dry form and in solution, easier handling and less danger of personnel, etc.

The foregoing description has by necessity been quite detailed. It is to be understood that the invention should not be limited thereby, but only by the scope of the appended claims.

What is claimed is:

1. A solid organic mercury composition readily soluble in water comprising a thoroughly blended mixture of (A) an organic mercury compound of the formula:

$$R\text{\textendash}[Hg\text{\textendash}X]_n$$

where R is an organic hydrocarbon radical selected from the group consisting of aromatic, aliphatic and alicyclic radicals; $n$ represents the degree of mercuration of the radical R; and X is a member of the group consisting of hydroxyl, an anion of an organic acid, and an anion of an inorganic acid; together with (B) from about 5 to about 95 percent by weight, based on the total weight of the mixture, of a normally solid amine compound of the formula:

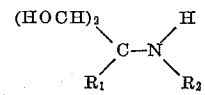

where $R_1$ and $R_2$ are members of the group consisting of hydrogen, alkyl radicals, aryl radicals, cycloalkyl radicals and hydroxyalkyl radicals containing from 1 to 3 carbon atoms.

2. Composition as defined in claim 1 wherein the amine compound (B) is tris(hydroxymethyl) aminomethane.

3. Composition as defined in claim 2 wherein said organic mercury compound is phenyl mercury acetate.

4. Composition as defined in claim 2 wherein said organic mercury compound is phenyl mercury benzoate.

5. Composition as defined in claim 2 wherein said organic mercury compound is phenyl mercury propionate.

6. Composition as defined in claim 2 wherein said organic mercury compound is phenyl mercury butyrate.

7. Composition as defined in claim 2 wherein said organic mercury compound is phenyl mercury lactate.

8. Compositon as defined in claim 2 wherein said organic mercury compound is phenyl mercury 2-ethylhexanoate.

9. Compositon as defined in claim 2 wherein said organic mercury compound is phenyl mercury borate.

10. Composition as defined in claim 2 wherein said organic mercury compound is phenyl mercury nitrate.

11. Composition as defined in claim 2 wherein the amine compound (B) is present in said composition in an amount sufficient to provide at least one mole of amine compound for each mole of mercury in the said organic mercury compound.

12. In the preparation of a solution of an organic mercury compound of the formula:

$$R\text{\textendash}[Hg\text{\textendash}X]_n$$

where R is an organic hydrocarbon radical selected from the group consisting of aromatic, aliphatic and alicyclic radicals, $n$ represents the degree of mercuration of the radical R, and X is a member of the group consisting of hydroxyl, an anion of an organic acid, and an anion of an inorganic acid, in a solvent selected from the group consisting of water, water miscible solvents, and mixtures thereof, the improvement which comprises dissolving in said solvent a normally solid amino compound having the formula:

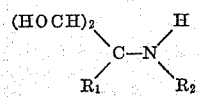

where $R_1$ and $R_2$ are members of the group consisting of hydrogen, alkyl radicals, aryl radicals, cycloalkyl radicals and hydroxyalkyl radicals containing from 1 to 3 carbon atoms, and dissolving in said solvent an amount of said organic mercury compound substantially in excess of the amount normally soluble in the same volume of solvent in the absence of said amino compound, the quantity of said amino compound dissolved in said solvent being in the range of from about 5 to 95 percent by weight of the total weight of said amino compound and said organic mercury compound.

References Cited by the Examiner
UNITED STATES PATENTS

| | | | |
|---|---|---|---|
| 2,423,262 | 7/1947 | Sowa | 167—30 |
| 2,958,625 | 11/1960 | Rebold | 167—30 |
| 2,982,394 | 5/1961 | Novak | 206—84 |
| 3,058,877 | 10/1962 | Musser | 260—431 |

TOBIAS E. LEVOW, *Primary Examiner.*

E. C. BARTLETT, H. M. S. SNEED,
*Assistant Examiners.*